US012580378B2

(12) United States Patent
Rusev et al.

(10) Patent No.: US 12,580,378 B2
(45) Date of Patent: Mar. 17, 2026

(54) POINT ON WAVE POLARITY DETECTION METHOD FOR SATURATION MITIGATION

(71) Applicant: S&C Electric Company, Chicago, IL (US)

(72) Inventors: Tsvetan Rusev, Morton Grove, IL (US); Michael Stamer, Northbrook, IL (US)

(73) Assignee: S&C Electric Company, Chicago, IL (US)

( * ) Notice: Subject to any disclaimer, the term of this patent is extended or adjusted under 35 U.S.C. 154(b) by 424 days.

(21) Appl. No.: 18/483,137

(22) Filed: Oct. 9, 2023

(65) Prior Publication Data

US 2024/0120726 A1     Apr. 11, 2024

Related U.S. Application Data

(60) Provisional application No. 63/415,185, filed on Oct. 11, 2022.

(51) Int. Cl.
| | |
|---|---|
| *H02H 3/00* | (2006.01) |
| *H02H 1/00* | (2006.01) |
| *H02H 3/06* | (2006.01) |
| *H02H 3/08* | (2006.01) |

(52) U.S. Cl.
CPC ............ *H02H 3/06* (2013.01); *H02H 1/0007* (2013.01); *H02H 3/08* (2013.01)

(58) Field of Classification Search
None
See application file for complete search history.

(56) References Cited

U.S. PATENT DOCUMENTS

| | | | | |
|---|---|---|---|---|
| 7,916,437 | B2 * | 3/2011 | Hardesty ................ | H01H 75/04 |
| | | | | 361/42 |
| 11,670,933 | B2 * | 6/2023 | Shen ..................... | H01H 33/596 |
| | | | | 361/93.1 |
| 2004/0144757 | A1 * | 7/2004 | Rhein ................ | H01H 33/6662 |
| | | | | 218/120 |
| 2022/0037879 | A1 * | 2/2022 | Stanek ................. | G01R 19/003 |

* cited by examiner

*Primary Examiner* — Stephen W Jackson

(57) ABSTRACT

A system and method for operating a vacuum interrupter in a self-resetting interrupter. The method includes detecting fault current, opening the vacuum interrupter a first time using power harvested from the current transformer when the fault current is detected, and storing a polarity of the detected fault current when the vacuum interrupter is opened. The method then determines a close time to close the vacuum interrupter so that the current has the same polarity that was stored when the vacuum interrupter was opened and that actuation of closing the vacuum interrupter ends at a current zero crossing, closes the vacuum interrupter at the close time, and opens the vacuum interrupter a second time after the vacuum interrupter is closed using power harvested from the current transformer.

20 Claims, 2 Drawing Sheets

POINT ON WAVE POLARITY DETECTION METHOD FOR SATURATION MITIGATION

CROSS-REFERENCE TO RELATED APPLICATION

This application claims the benefit of priority from the U.S. Provisional Application No. 63/415,185, filed on Oct. 11, 2022, the disclosure of which is hereby expressly incorporated herein by reference for all purposes.

BACKGROUND

Field

This disclosure relates generally to a system and method for operating a switch and, more particularly, to a system and method for operating a vacuum interrupter in a self-resetting interrupter.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three phase feeders including three single phase feeder lines that carry the same current, but are 120° apart in phase. A number of three phase and single phase lateral lines are tapped off of the feeder that provide the medium voltage to various distribution transformers, where the voltage is stepped down to a low voltage and is provided to a number of loads, such as homes, businesses, etc. Power distribution networks of the type referred to above typically include a number of switching devices, breakers, reclosers, interrupters, etc. that control the flow of power throughout the network.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Traditionally, a fuse is employed as a primary overload protection device for protecting distribution transformers and other devices that has a certain rating so that the fuse will operate above a transformer inrush current, but below a transformer through fault protection withstand or damage curve. However, fuses often create an arc when they operate, which has obvious safety dangers and drawbacks.

It has become increasingly popular to replace the traditional fuse with a cutout-mounted self-powered fault interrupting device that employs a vacuum interrupter and a magnetic actuator to operate the vacuum interrupter. A vacuum interrupter is a switch that employs opposing contacts, one fixed and one movable, positioned within a vacuum enclosure. When the vacuum interrupter is opened by operating the magnetic actuator to move the movable contact away from the fixed contact to prevent current flow through the interrupter a plasma arc is created between the contacts that is contained and quickly extinguished by the vacuum at the next zero current crossing. When fault current is detected by the device the vacuum interrupter is opened and the device may be released or "drop out" from its mounting indicating that it has operated. Point-on-wave (POW) switching is sometimes employed for these types of devices, which is a microprocessor-based switching technique used to eliminate the random nature of mechanical switching devices. POW switching determines the phase angle of the voltage or current cycle and opens or closes the vacuum interrupter at a predetermined point on the AC wave to reduce switching transients and arcing.

These types of self-powered fault interrupting devices typically detect the current and/or voltage on the line to monitor current flow and have controls that indicate problems with the network circuit, such as detecting a high current fault event. If such a high fault current is detected the interrupting device is opened in response thereto, and then after a short delay closed to determine whether the fault is a temporary fault. If high fault current flows when the interrupting device is closed after opening, it is immediately re-opened. If the fault current is detected a second time, or multiple times, during subsequent opening and closing operations indicating a persistent fault, then the interrupting device remains open and may dropout, where the time between detection tests may increase after each test.

Fault interrupting devices employed for protection of downstream equipment where a fuse would normally be used require one-cycle or faster clearing times, which requires capable energy harvesting systems. Thus, these fault interrupting devices often employ current transformers that are connected in series with the power line to provide the self-power to operate the actuator and device electronics. Transformer saturation is a magnetization state that is reached when the core flux density stops increasing with increasing primary current through the transformer and is a well-understood phenomenon. While saturation of instrumentation transformers can have a significant detrimental effect on protective relaying, current transformers used for power-line energy harvesting can be operated partially or temporarily saturated to allow the passing of high magnitude currents, provided they can deliver the desired amount of energy. One-cycle clearing is especially challenging when reclosing into fault current because system current power harvesting cannot begin until the completion of the close operation, where any energy harvested during this time would be used up since the actuator is being driven. For one type of device, the actuator is driven for approximately 7 ms after the start of current flow, which is almost half power cycle at 60 Hz. This is compounded by the random closing phase angle and the residual flux of the current transformer, which can further limit the energy harvesting ability of the current transformer.

It is often desirable to reduce the size and weight of these types of fault interrupting devices for a number of reasons, such as reducing cost and installation complexity by being able to install and remove the devices from the pole on which they are mounted using a hot stick. Since a current transformer is typically a large and heavy device, it is one area where size and weight reduction is investigated. Since reducing the size of the transformer causes it to saturate at lower power and not operate properly as a current transformer for energy harvesting purposes, reducing the size of the current transformer creates a number of challenges.

SUMMARY

The following discussion discloses and describes a system and method for operating a switch using power harvested from a current transformer. In one non-limiting embodiment, the switch is a magnetically actuated vacuum interrupter in a self-resetting interrupter. For that embodiment, the method includes detecting fault current using power harvested from the current transformer, opening the vacuum interrupter a first time, and storing the polarity of the last half-cycle of current. The method then determines a close polarity and phase angle so that reclosing occurs on the same polarity half-cycle as the polarity that was stored when the vacuum interrupter was opened and that actuation of closing the vacuum interrupter ends at a zero crossing of the first half-cycle of current, closes the vacuum interrupter, and opens the vacuum interrupter a second time after the vacuum interrupter is closed using power harvested from the current transformer.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for operating a switch is merely exemplary in nature, and is in no way intended to limit the disclosure or its applications or uses. More specifically, the system and method are discussed below in connection with operating a vacuum interrupter in a self-resetting interrupter. However, the system and method will have other applications.

Figure 1:
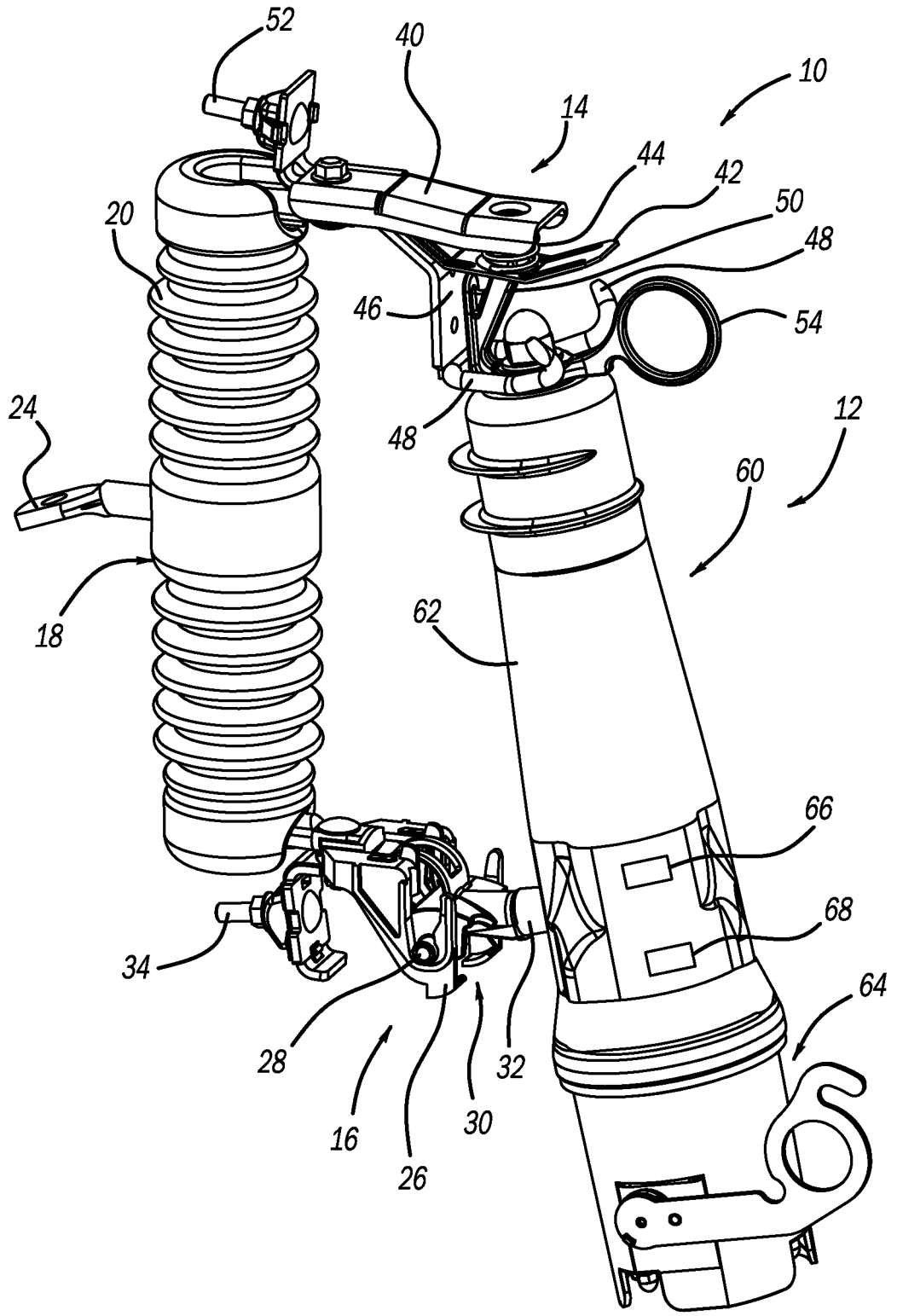
FIG. 1 is an isometric view of a switch assembly connected to a pole mounted insulator and including a magnetically actuated switching device having a vacuum interrupter.

FIG. 1 is an isometric view of a pole mounted switch assembly 10 including a single phase self-powered magnetically actuated switching device 12 intended to represent any switching device that operates as a self-resetting interrupter suitable for the purposes discussed herein. The switching device 12 is coupled to an upper coupling assembly 14 at a top end and a lower coupling assembly 16 at a bottom end. The upper assembly 14 is secured to one end of an insulator 18 having skirts 20 and the lower assembly 16 is secured to an opposite end of the insulator 18, where the insulator 18 is mounted to a bracket 24 that may be attached to a utility pole (not shown). The lower assembly 16 includes a channel catch 26 that accepts a pivot rod 28 associated with a trunnion assembly 30 having a trunnion 32 coupled to the device 12 and that is electrically coupled to a unit bottom contact (not shown). A connector 34 accepts a wire (not shown) at a load side of the device 12 that is electrically coupled to the unit bottom contact. The upper assembly 14 includes a top mounting tab 40, an extension tab 42 and a spring 44 positioned between the tabs 40 and 42. The upper assembly 14 also includes a support tab 46 secured to the mounting tab 40 and a pair of mounting horns 48 coupled to and extending from the support tab 46 opposite to the extension tab 42. A unit top contact 50 is positioned between the horns 48 and engages the tab 42 against the bias of the spring 44 to hold the switching device 12 in the upper assembly 14. A connector 52 accepts a wire (not shown) at a source side of the device 12 that is electrically coupled to the unit top contact 50 of the device 12 through the upper assembly 14. A guiding pull ring member 54 is coupled to a top of the device 12 and allows a worker to easily remove the device 12 from the utility pole by pulling on the ring member 54 to disengage the contact 50 from the upper assembly 14, rotating the device 12 outward on the pivot rod 28 and then lifting the device 12 out of the catch 26.

The switching device 12 includes a vacuum interrupter 60 having an outer housing 62, where the vacuum interrupter 60 is representative of any vacuum interrupter known in the art suitable for the purposes discussed herein. The vacuum interrupter 60 includes a vacuum chamber that encloses a fixed contact that is electrically coupled to the unit top contact 50 and a movable contact that is electrically coupled to the unit bottom contact, where the fixed and movable contacts are in contact with each other within the vacuum chamber when the vacuum interrupter 60 is closed. When the vacuum interrupter 60 is opened by moving the movable contact away from the fixed contact the arc that is created between the contacts is extinguished by the vacuum at a zero current crossing. The switching device 12 also includes a magnetic actuator 64 that is coupled to the vacuum interrupter 60 by a drive linkage (not shown) for opening and closing the vacuum interrupter 60. The switching device 12 further includes a current transformer 66 that harvests energy to operate the switching device 12 and open the vacuum interrupter 60 when fault current is detected in a manner well understood by those skilled in the art. The switching device 12 also includes a control system 68 that is representative of all of the devices and algorithms necessary for detecting and processing current and voltage measurements, providing command signals, etc. for purposes of the discussion herein, and includes at least one processor and a memory device storing data and executable code.

This disclosure proposes a point-on-wave (POW) and polarity detection technique that increases the energy harvesting capacity of the current transformer 66. In other words, the described technique allows the current transformer 66 to saturate, but still provide the desired amount of power to open the vacuum interrupter 60. Therefore, a smaller and lighter current transformer can be employed.

The energy harvesting capacity of the current transformer 66 depends, among other things, on the level of remnant flux and its polarity. These values are determined by the magnitude and polarity of the last half-cycle of primary current. It follows that when closing into a fault, the energy harvesting capacity of the transformer 66 depends on the magnitude and polarity of the last loop of current associated with the previous fault. From the relationship $V=Nd\phi/dt=Ldi/dt$, it follows that the current transformer 66 is most effective in harvesting energy when di/dt is at its highest level, which occurs near current zero crossings. Combining all of the above, the current transformer 66 is most effective in harvesting energy near a current zero crossing when current transitions to the opposite polarity of the last half-cycle of current.

When fault current is detected and the vacuum interrupter 60 is opened in response thereto, the polarity of the last loop of fault current is stored in memory and used in the determination of the closing polarity. The POW closing angle is set such that the first half-cycle of current has a duration equivalent to the time the actuator 64 is driven after the start of fault current. In this way, upon completion of the close operation the current transformer 66 is presented with a current zero crossing transition in the opposite polarity, which allows the device to harvest energy faster and clear the fault in one power cycle.

Figure 2:
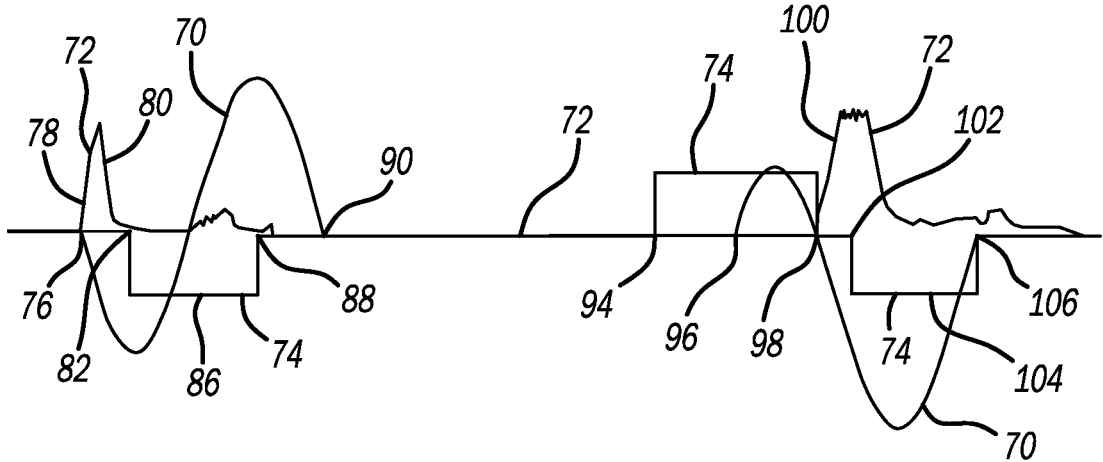
FIG. 2 is a time line illustrating a POW closing and polarity detection operation for the switching device.

FIG. 2 is a time line showing a POW closing and polarity detection operation for the switching device 12 illustrating the above-described described technique, where line 70 is the detected fault current, line 72 is the voltage on the output on the secondary winding of the current transformer 66 and line 74 is actuation of the magnetic actuator 64 for both open and close operations. When fault current becomes present at time 76, voltage is available at the output of the current transformer 66 and energy is stored in, for example, a capacitor (not shown) at time 78 until the current transformer 66 becomes saturated near a current peak and the voltage drops off at time 80. The energy that has been stored is now available to open the vacuum interrupter 60, where the opening sequence of the switching device 12 begins at time 82 after about one-quarter of a power cycle after the start of fault current. At the next zero-crossing of the current, the transformer 66 is no longer saturated and energy is again available to be stored, which generally coincides with the time that the contacts in the vacuum interrupter 60 separate at about time 86. The opening sequence is completed at time 88 and the arc is extinguished at the next zero-crossing at time 90. The control system 68 records the polarity of the current cycle, here positive, when opening sequence of the vacuum interrupter 60 is completed. This determines the polarization of the magnetic domains in the core of the current transformer 66.

For the reclosing operation, and assuming that the fault current is still present, the vacuum interrupter 60 is commanded closed at a calculated time 94 based on the measured phase of the voltage across the switching device 12 so that when the vacuum interrupter contacts are engaged the fault current is of the same polarity as when the vacuum interrupter 60 was last opened. The harvested energy stored in the capacitor from the last time energy was harvested from the current transformer 66 has been previously used to open the vacuum interrupter 60, so the closing operation uses power from another source, such as from the voltage potential across the vacuum interrupter 60. The actuator 64 moves the movable contact, which engages the fixed contact at time 96 and the current begins to rise. Electrical contact between the fixed and movable contacts of the vacuum interrupter 60 occurs at a point on the wave that produces a minor asymmetric half-cycle of current. Further, during the closing operation the secondary winding of the current transformer 66 is shorted so that it does not saturate, which prevents the transformer 66 from energy harvesting for the duration of the closing operation as shown by the line 72. The actuator 64 is still driving the movable contact after the time 96 against the bias of a compliance spring until time 98. The timing of the closing operation is set so that the time 98 coincides with the zero-crossing of the minor current loop.

Because the polarity of the current and the polarity of the magnetic domain in the core of the transformer 66 is changing from positive to negative at the time 98, the current transformer 66 comes out of saturation and significant energy harvesting occurs after time 100. Enough energy is harvested within a quarter-cycle to begin the opening operation of the vacuum interrupter 60 at time 102, where the fixed and movable contacts in the vacuum interrupter 60 separate at time 104 and the opening operation ends at time 106, which is a fast close-open operation.

Figure 3:
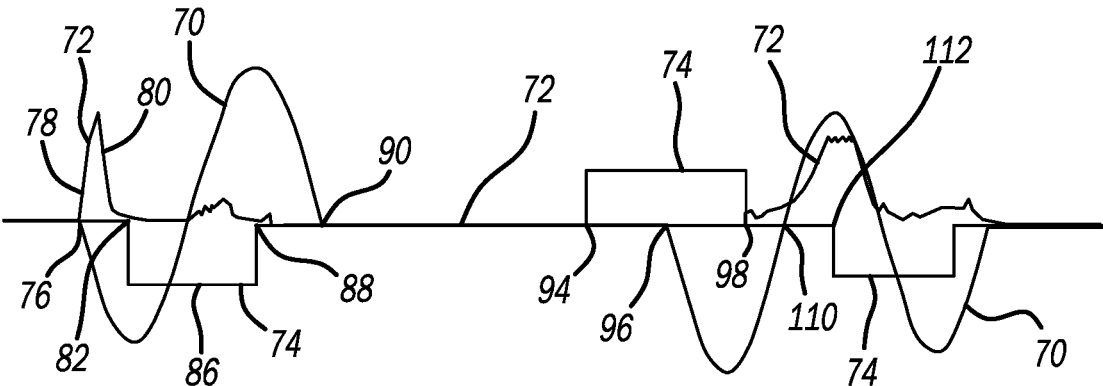
FIG. 3 is a time line illustrating a known random closing operation for the switching device.

FIG. 3 is a time line showing a known random closing operation for the switching device 12 to illustrate the longer time between closing and then opening the switching device 12 during the reclosing operation, where like elements are identified by the same reference number. The fault detection and opening of the vacuum interrupter 60 when fault current is detected is the same, however, the polarity of the current cycle when the opening operation of the vacuum interrupter 60 is completed is not recorded. The closing of the vacuum interrupter 60 at the time 94 is random relative to the phase angle of the current and for this example, the contact point between the fixed and movable contacts at the time 96 occurs during a negative polarity of the current cycle. The end of the close operation at the time 98 occurs near a current peak of the power cycle where the current transformer 66 is still in saturation and the system 68 is unable to effectively harvest enough energy to execute an open operation. Most of the required energy for the opening operation of the vacuum interrupter 60 is harvested following the next current zero crossing at time 110, where it takes until time 112 to provide enough energy to open the vacuum interrupter 60. From an energy harvesting perspective, the time from the end of the close operation at the time 98 of the switching device 12 to the first zero crossing at the time 110 is time lost and results in a longer clearing time for the switching device 12. This illustrates how the POW and polarity detection technique can be used to improve the energy harvesting capabilities and the interrupting performance of the switching device 12. Thus, using the POW closing and polarity detection technique discussed above allows for under-sizing of the current transformer 66, which translates into reduction in size, weight and cost of the switching device 12. More specifically, in order to clear a fault during the reclosing operation in the desired amount of time as shown in FIG. 2, a larger current transformer would be required to achieve the same clearing time for the operation shown in FIG. 3.

As will be well understood by those skilled in the art, the several and various steps and processes discussed herein to describe the disclosure may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for operating a switch, the method comprising:

detecting current;

opening the switch a first time using power harvested from a current transformer;

storing a polarity of a current half-cycle of the detected current when the switch is opened;

determining a close time to close the switch so that the polarity of a first half-cycle of current has the same polarity that was stored when the switch was opened; and closing the switch at the close time.

2. The method according to claim 1 wherein determining a close time includes determining the close time based on a phase angle of a voltage potential across the switch.

3. The method according to claim 1 wherein determining a close time includes determining the close time so that actuation of closing the switch ends at a zero crossing of the current.

4. The method according to claim 3 further comprising opening the switch a second time after the switch is closed using power harvested from the current transformer.

5. The method according to claim 4 wherein opening the switch a second time includes opening the switch as soon as the current transformer has generated enough power to open the switch.

6. The method according to claim 5 further comprising shorting an output of the current transformer while the switch is closing to prevent the current transformer from saturating.

7. The method according to claim 1 wherein the switch is actuated open and closed by a magnetic actuator.

8. The method according to claim 1 wherein the switch is a vacuum interrupter.

9. The method according to claim 1 wherein the current is fault current and the switch is part of a self-resetting interrupter.

10. The method according to claim 9 wherein the self-resetting interrupter is a cutout mounted self-resetting interrupter.

11. A method for operating a self-resetting interrupter, the self-resetting interrupter including a vacuum interrupter, a magnetic actuator for opening and closing the vacuum interrupter and a current transformer providing power to open the vacuum interrupter, the method comprising:

detecting fault current;

opening the vacuum interrupter a first time using power harvested from the current transformer when the fault current is detected;

storing a polarity of a current half-cycle of the detected fault current when the vacuum interrupter is opened;

determining a close time to close the vacuum interrupter so that the polarity of a first half-cycle of current has the same polarity that was stored when the vacuum interrupter was opened and that actuation of closing the vacuum interrupter ends at a zero crossing of the current;

closing the vacuum interrupter at the close time; and opening the vacuum interrupter a second time after the vacuum interrupter is closed using power harvested from the current transformer.

12. The method according to claim 11 wherein determining a close time includes determining the close time based on a phase angle of a voltage potential across the vacuum interrupter.

13. The method according to claim 11 wherein opening the vacuum interrupter a second time includes opening the vacuum interrupter as soon as the current transformer has generated enough power to open the vacuum interrupter.

14. The method according to claim 13 further comprising shorting an output of the current transformer while the vacuum interrupter is closing to prevent the current transformer from saturating.

15. The method according to claim 11 wherein the self-resetting interrupter is a cutout mounted self-resetting interrupter.

16. A system for operating a self-resetting interrupter, the self-resetting interrupter including a vacuum interrupter, a magnetic actuator for opening and closing the vacuum interrupter and a current transformer providing power to open the vacuum interrupter, the system comprising:

a controller including at least one processor and a memory device storing data and executable code that, when executed, causes the at least one processor to:

detect fault current;

open the vacuum interrupter a first time using power harvested from the current transformer when the fault current is detected;

store a polarity of a current half-cycle of the detected fault current when the vacuum interrupter is opened;

determine a close time to close the vacuum interrupter so that the polarity of a first half-cycle of current has the same polarity that was stored when the vacuum interrupter was opened and that actuation of closing the vacuum interrupter ends at a zero crossing of the current cycle;

close the vacuum interrupter at the close time; and open the vacuum interrupter a second time after the vacuum interrupter is closed using power harvested from the current transformer.

17. The system according to claim 16 wherein determining a close time includes determining the close time based on a phase angle of a voltage potential across the vacuum interrupter.

18. The system according to claim 16 wherein opening the vacuum interrupter a second time includes opening the vacuum interrupter as soon as the current transformer has generated enough power to open the vacuum interrupter.

19. The system according to claim 18 wherein control electronics short an output of the current transformer while the vacuum interrupter is closing to prevent the current transformer from saturating.

20. The system according to claim 16 wherein the self-resetting interrupter is a cutout mounted self-resetting interrupter.

\* \* \* \* \*